April 1, 1924.

N. EKBERG

GRABHOOK FOR AUTOMOBILES

Filed Feb. 28, 1923

1,488,744

INVENTOR:
Nels Ekberg
BY A.M.Carlsen
ATTORNEY.

Patented Apr. 1, 1924.

1,488,744

UNITED STATES PATENT OFFICE.

NELS EKBERG, OF ST. PAUL, MINNESOTA.

GRABHOOK FOR AUTOMOBILES.

Application filed February 28, 1923. Serial No. 621,830.

*To all whom it may concern:*

Be it known that I, NELS EKBERG, a citizen of the United States, residing at St. Paul, in the county of Ramsey and State of Minnesota, have invented certain new and useful Improvements in Grabhooks for Automobiles, of which the following is a specification.

My invention relates to grab-hooks particularly adapted for lifting and towing automobiles, and the object is to provide a simple and efficient device for said purpose.

In the accompanying drawing:—

Figure 1:
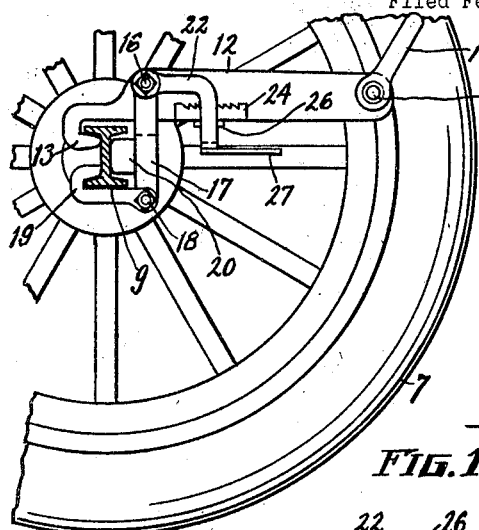
Fig. 1 is a side elevation of a portion of the front wheel of an automobile and its axle and my device attached to the latter in position to lift the front end of the automobile.
Figure 3:
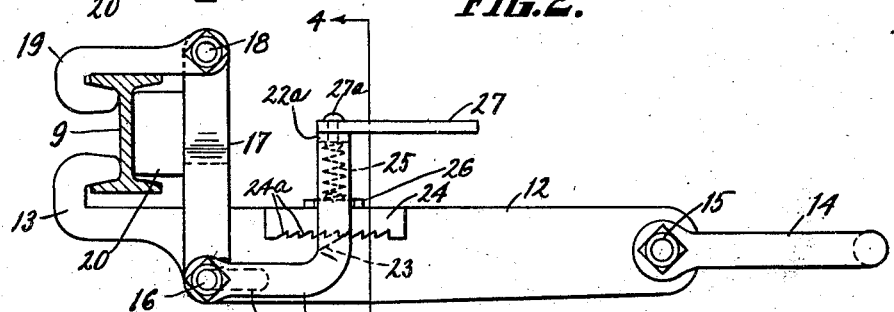
Fig. 3 is a side view of Fig. 2 and showing in addition a section of the front axle of an automobile.
Figure 5:
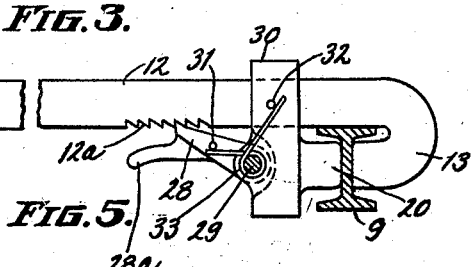
Fig. 5 is a side elevation of the device in a modified form.

Referring to the drawing by reference numerals, 7 indicates the front wheels, each having the usual steering knuckle 8 pivoted in the forked end 9ª of the front axle 9, the latter made in the usual form of an I-beam in cross section (see Figs. 1, 3 and 5).

Figure 6:
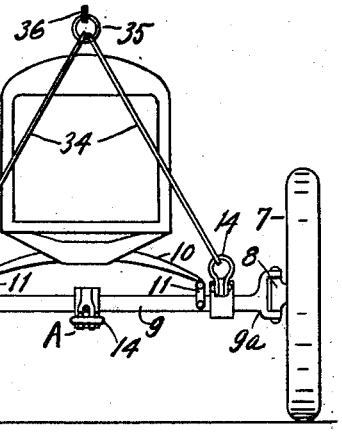
Fig. 6 is a front view of an automobile with three of my devices on its front axle, two of them fixed for raising and towing the auto and the other for towing only.

In Fig. 6 I have illustrated the type of automobile having a transversely arranged front leaf spring 10 spaced above the axle by links 11, but my device is readily adapted to all other types of cars as well, it being understood that longitudinally arranged body supporting springs (not shown) are secured to the same type of axle shown and do not interfere with the use of my device.

The device comprises a main shank or hook bar 12 preferably made of heavy flat bar steel and one end, the rear, formed with a hook 13 adapted to contact with one of the rear flanges of the axle 9 as the end of the hook engages the adjacent web of the axle the bar itself normally extending forward from the axle and preferably having a shackle 14 pivotally secured as at 15 to said forward end for a purpose to be described.

Figure 2:
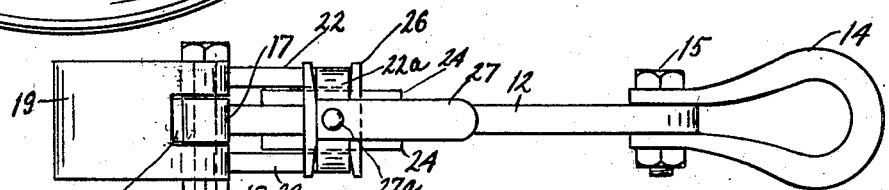
Fig. 2 is a top view of my device as used for towing purposes only.

For convenience of description the preferred form of my device will be described with particular reference to Fig. 1 which illustrates the device as used for lifting and towing, it being understood that for towing purposes only the device is inverted as in Figs. 2, 3 and 5, but clamped on the axle in the same manner in both instances.

Figure 4:
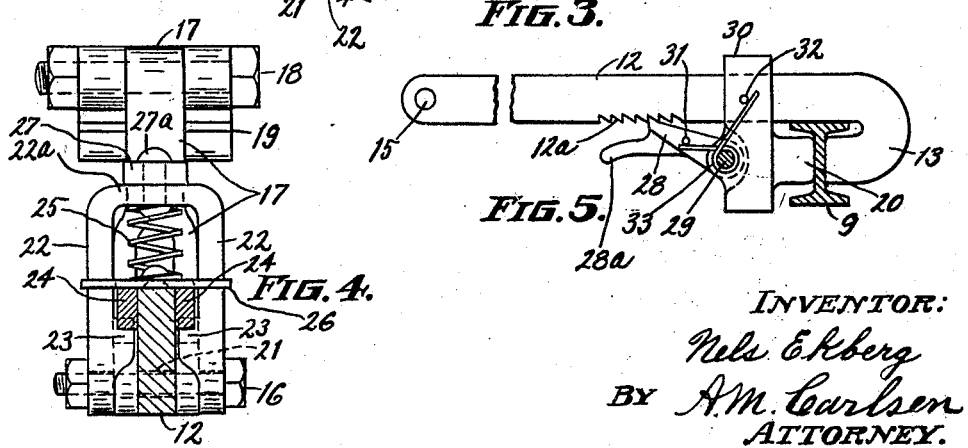
Fig. 4 is a sectional view on the line 4—4 in Fig. 3, omitting the automobile axle.

At a suitable predetermined distance forward of the hook 13, I secure pivotally on the pivot pin 16 transversely arranged in the bar, a forked member 17. The lower end of the leg of said fork is bored for a pivot bolt 18 on which is pivotally held the forward end of another hook member 19 adapted to engage the inner and lower flange of the axle and the adjacent rear web surface. A solid rectangular block 20 is welded or otherwise secured to the rear side of the fork member 17 in such a manner as to engage the front web surface of the axle when the hooks 13—19 engage the rear web surface. The pivot pin 16 of the fork member 17 is slidable horizontally in a slot 21 in bar 12 but the fork 17 and its block 20 together with the hook members 13—19 are securely held in gripping position on the axle by an L-shaped yoke 22 the ends of which are pivoted on said pin 16. The arms of said yoke extend horizontally forward from the pivot and spaced transversely from both sides of the shank 12, and are then extended vertically to the integral cross bar 22ª, below bar 12 in Fig. 1 and above said bar in Figs. 2, 3 and 4. Said vertical portions of the yoke 22 have each an inner integral tooth 23, both teeth adapted to simultaneously engage the teeth 24ª of two toothed racks 24 arranged on opposite sides of the shank 12. The said teeth 23 are normally held in contact with the teeth of the racks 24 by a compression coil spring 25 (see Figs. 3 and 4) interposed between the cross bar 22ª of the yoke and a plate 26 resembling a cross-head and adapted to move vertically only with the legs of the yoke 22 as guides. A longitudinally arranged handle 27 may be secured to the cross arm 22ª of the yoke as at 27ª, and with this handle the yoke may be pressed toward the bar 12, against the pressure of spring 25, thus disengaging it from the tooth racks and the yoke may be moved horizontally to engage any tooth of the rack, such movement being possible because of the slot 21 in the bar. If the yoke is slid away from the hook 13 the space between bar 17 and said hook is increased so that the latter may be removed from contact with the axle. Then by swinging the shank 12 so that block 20 is away from the axle the hook 19 may be released by pushing it away from the axle, rearwardly, and swinging it from the latter.

In the modified form of my device, shown in Fig. 5, the bar or shank 12 is provided with ratchet teeth 12$^a$ on its under side and adapted to be engaged by a ratchet dog 28 pivoted as at 29 in the lower portion of a sliding member 30 movable on the shank 12. Suitable resilient means are provided for pressing the dog into contact with the teeth, such as pins 31—32 in the dog and sliding members respectively, said pins being engaged by the opposite ends of a coil spring 33 on the pivot 29. The rear side of member 30 has an integral projection 20 to contact with the web of the axle. 28$^a$ is an extension of dog 28 forming a finger catch for disengaging the ratchet dog and permitting sliding the member 30 forward to release the device from the auto axle.

In Fig. 6 two of my devices are shown near the opposite ends of the front axle of an automobile and connected to a ring 35 by cables 34. Said ring may be engaged by the hook 36 of any suitable hoisting device (not shown). When my devices are used in this manner they are preferably clamped on the axle as in Fig. 1, but when an automobile is simply to be towed only one of the devices is necessary and it can be clamped at almost any point on the front axle but preferably near the middle as at A in Fig. 6. Fig. 3 illustrates the preferred way of clamping the device on the axle for towing purposes only, that is with the hook 13 engaging the lower rearward flange of the axle.

What I claim is:—

1. A grab-hook of the class described comprising a shank having an aperture at one end, a hook at the opposite end adapted to engage one flange and the adjacent web of an automobile axle, means adjustable laterally in the shank for engaging the corresponding opposite flange and the same side of the web of the axle, and further means on said adjustable part for simultaneously engaging the opposite side of the axle.

2. The structure specified in claim 1, and a shackle pivotally secured to the end of the shank having an aperture, for the purpose set forth.

3. The structure specified in claim 1, said laterally adjustable means comprising a fork member normally straddling the shank at about right angles to the latter, the arms of said fork pivotally secured on a pin passed transversely through a horizontally slotted portion of the shank, a hook member pivotally secured to the leg of said fork member and its hook adapted to engage the flange and adjacent web vertically opposite from the flange and web portion of an automobile axle engaged by the hook of the shank and said means for engaging the opposite side of the web of the axle consisting of a block secured on the side of the fork member nearest said hooks.

4. The structure specified in claim 3, said adjustable means for securing the hooks and the block in clamping position on an automobile axle comprising an L-shaped yoke straddling the shank and pivoted on the pivot pin passed through the fork member, a rack secured on each side of the shank and a tooth in each leg of the said yoke, both of said teeth adapted to simultaneously engage the teeth of the opposite racks and means for normally holding said teeth and racks in contact.

5. The structure specified in claim 4, said latter means comprising a compression coil spring interposed between the closed portion of the yoke and a plate contacting with the adjacent edge of the shank and guided by the legs of the yoke member.

In testimony whereof I affix my signature.

NELS EKBERG.